(12) United States Patent
Lee et al.

(10) Patent No.: US 6,579,075 B2
(45) Date of Patent: Jun. 17, 2003

(54) COMPRESSOR

(75) Inventors: In Seop Lee, Seoul (KR); Sang Heon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 09/832,820

(22) Filed: Apr. 12, 2001

(65) Prior Publication Data

US 2002/0085931 A1 Jul. 4, 2002

(30) Foreign Application Priority Data

Dec. 28, 2000 (KR) ........................................ 2000-84243

(51) Int. Cl.[7] .......................... F04B 39/00; F04B 39/10; F16K 15/16
(52) U.S. Cl. ..................... 417/312; 417/569; 137/857
(58) Field of Search ............................... 417/312, 569; 137/857; 181/229, 403

(56) References Cited

U.S. PATENT DOCUMENTS

| | | | | |
|---|---|---|---|---|
| 4,628,963 A | * | 12/1986 | Ishijima et al. | 137/857 |
| 4,729,402 A | * | 3/1988 | Blass et al. | 137/514.5 |
| 5,584,674 A | * | 12/1996 | Mo | 417/312 |
| 5,885,064 A | * | 3/1999 | McCoy | 417/569 |
| 5,887,622 A | * | 3/1999 | Ahn | 137/856 |
| 6,012,489 A | * | 1/2000 | Rene et al. | 137/856 |

* cited by examiner

Primary Examiner—Charles G. Freay
Assistant Examiner—Michael K. Gray
(74) Attorney, Agent, or Firm—Birch, Stewart, Kolasch & Birch, LLP

(57) ABSTRACT

A compressor for refrigeration cycles, which is provided with a noise attenuation structure on the interior wall of the discharge plenum, is disclosed. In the compressor of this invention, a valve seat is covered with a head cover at its top to form a discharge plenum between the valve seat and the head cover. This discharge plenum temporarily stores a pressurized working fluid therein. The valve seat has a fluid inlet used for allowing an introduction of the pressurized working fluid into the discharge plenum, and a fluid outlet used for discharging the pressurized working fluid from the discharge plenum. A control valve is mounted to the valve seat so as to control the fluid inlet. A plurality of micro-projections are provided on the interior wall of the discharge plenum for absorbing and attenuating impact waves of the working fluid during an introduction of the working fluid into the discharge plenum, thus attenuating operational noises and vibrations caused by the impact waves. A plurality of spaces capable of capturing working fluid drops are defined between the projections and interior wall of the discharge plenum, thus absorbing and attenuating the impact waves of the working fluid during the introduction of the working fluid into the discharge plenum.

15 Claims, 3 Drawing Sheets

COMPRESSOR

BACKGROUND OF THE INVENTION

1. Field of the Invention

The present invention relates to a compressor used in refrigeration cycles and, more particularly, to a compressor designed to effectively attenuate operational noises and vibrations caused by the surging of an exhaust working fluid under high pressure within a discharge plenum of the compressor, thus improving the operational reliability of the refrigeration cycles.

2. Description of the Prior Art

As well known to those skilled in the art, a reciprocating compressor is a device that compresses and discharges a working fluid by a reciprocating motion of a piston. The reciprocating compressors have been typically used for compressing a working fluid to make a highly pressurized working fluid in a refrigeration cycle.

FIGS. 1 and 2 are an exploded perspective view and a sectional view of a part of a conventional reciprocating compressor.

As shown in the drawings, the conventional compressor comprises a valve seat 106, a head cover 108, and a control valve 118. The head cover 108 covers the top of the valve seat 106 to form a cavity between the valve seat 106 and the head cover 108. A fluid inlet 102 is formed at the valve seat 106, and allows an introduction of a highly pressurized working fluid, compressed by a reciprocating motion of a piston (not shown), into the cavity between the valve seat 106 and the head cover 108. The valve seat 106 also has a fluid outlet 104, through which the highly pressurized working fluid is discharged from the cavity. The control valve 118 is mounted to the valve seat 106 so as to control the fluid inlet 102.

The cavity, defined between the valve seat 106 and the head cover 108 and used for temporarily storing the highly pressurized working fluid therein, is a so-called discharge plenum 112. A valve spring 120 and a retainer 122 are mounted to the valve seat 106 at positions above the control valve 118.

The retainer 122 holds the first ends of both the control valve 118 and the valve spring 120, and limits the opening angle of the control valve 118.

In an operation of the conventional reciprocating compressor, a highly pressurized working fluid compressed by a reciprocating motion of the piston is introduced into the discharge plenum 112 through the fluid inlet 102. In such a case, the control valve 118 is opened while overcoming the spring force of the valve spring 120 due to the pressure of the inlet working fluid. Therefore, the working fluid is introduced into the discharge plenum 112, and is increased in its pressure to a predetermined level prior to being discharged from the plenum 112 through the fluid outlet 104.

However, the conventional compressor is problematic as follows. That is, when the highly pressurized working fluid is introduced into the discharge plenum 112 through the fluid inlet 102, the working fluid actively surges and is instantaneously compressed within the discharge plenum 112, thus colliding against the interior wall of the plenum 112. Due to such a surging of the working fluid within the discharge plenum 112, the conventional reciprocating compressor undesirably generates operational noises and vibrations, in addition to a reduction in flow rate during an operation.

SUMMARY OF THE INVENTION

Accordingly, the present invention has been made keeping in mind the above problems occurring in the prior art, and an object of the present invention is to provide a compressor for refrigeration cycles, which is provided with a noise attenuation structure on the interior wall of the discharge plenum, thus effectively absorbing and attenuating the impact waves of the working fluid generated when the impact waves collide against the interior wall of the plenum, and which thus effectively attenuates operational noises and vibrations during an operation.

In order to accomplish the above object, the present invention provides a reciprocating compressor, comprising: at least one reciprocating piston operatively compressing a working fluid within said compressor; and a valve assembly, wherein said valve assembly includes a valve seat covered with a head cover at its top to form a discharge plenum between said valve seat and said head cover, said discharge plenum temporarily storing a pressurized working fluid therein, said valve seat having a fluid inlet used for allowing an introduction of the pressurized working fluid into said discharge plenum, and a fluid outlet used for discharging the pressurized working fluid from the discharge plenum; a control valve mounted to said valve seat and used for controlling the fluid inlet; and noise attenuation means provided within said discharge plenum for absorbing and attenuating impact waves of the working fluid during an introduction of the working fluid into the discharge plenum, thus attenuating operational noises and vibrations caused by said impact waves, wherein said noise attenuation means comprises a plurality of micro-projections formed on an interior wall of the discharge plenum, with of micro spaces being defined between the microprojections and the interior wall of the discharge plenum and being capable of capturing working fluid drops therein.

BRIEF DESCRIPTION OF THE DRAWINGS

These and other objects are also accomplished by a valve assembly for a compressor comprising a valve seat covered with a head cover at its top to form a discharge plenum between the valve seat and the head cover, the discharge plenum temporarily storing a pressurized working fluid therein, the valve seat having a fluid inlet used for allowing an introduction of the pressurized working fluid into the discharge plenum, and a fluid outlet used for discharging the pressurized working fluid from the discharge plenum; a control valve mounted to the valve seat and used for controlling the fluid inlet; and noise attenuation means provided within the discharge plenum for absorbing and attenuating impact waves of the working fluid during an introduction of the working fluid into the discharge plenum, thus attenuating operational noises and vibrations caused by the impact waves, wherein the noise attenuation means comprises a plurality of micro-projections formed on an interior wall of the discharge plenum, with a plurality of micro spaces being defined between the microprojections and the interior wall of the discharge plenum and being capable of capturing working fluid drops therein.

The above and other objects, features and other advantages of the present invention will be more clearly understood from the following detailed description taken in conjunction with the accompanying drawings, in which.

DETAILED DESCRIPTION OF THE INVENTION

Figure 1:
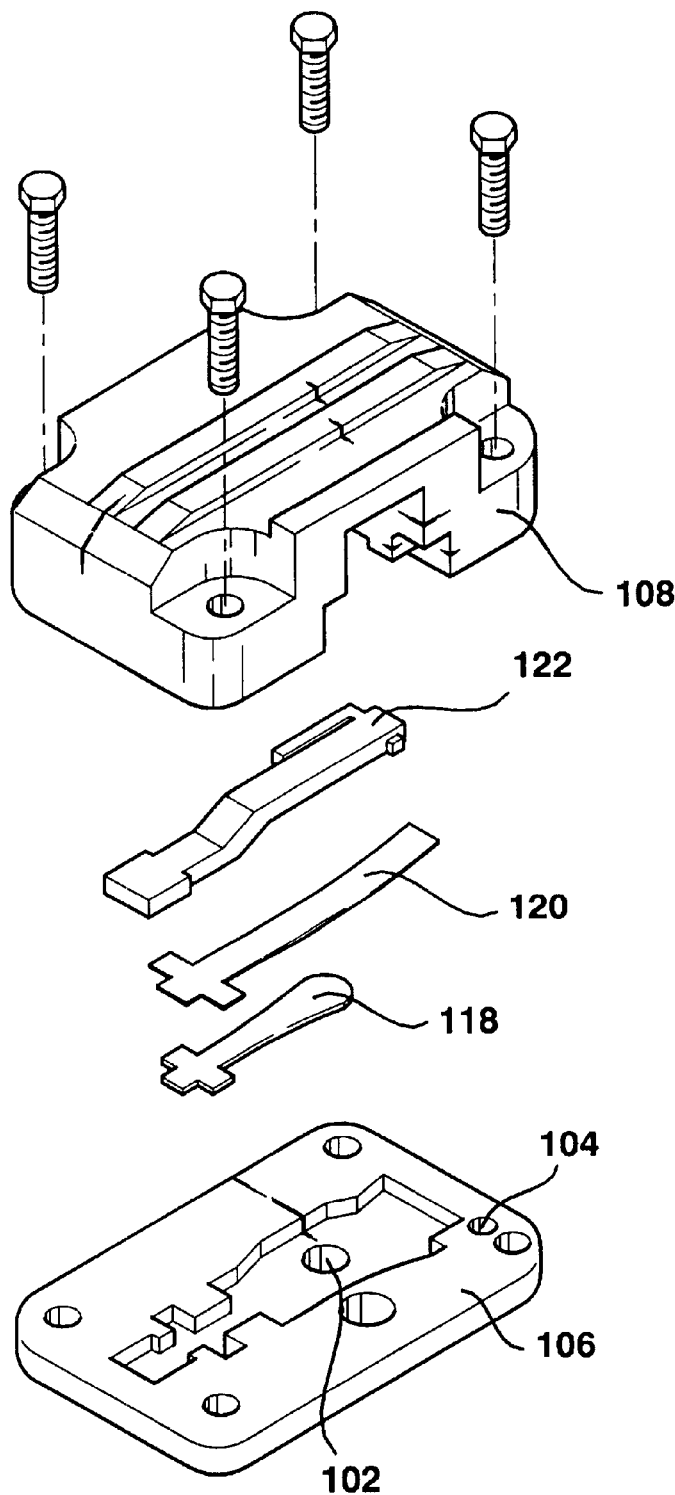
FIG. 1 is an exploded perspective view of a part of a conventional reciprocating compressor.
Figure 2:
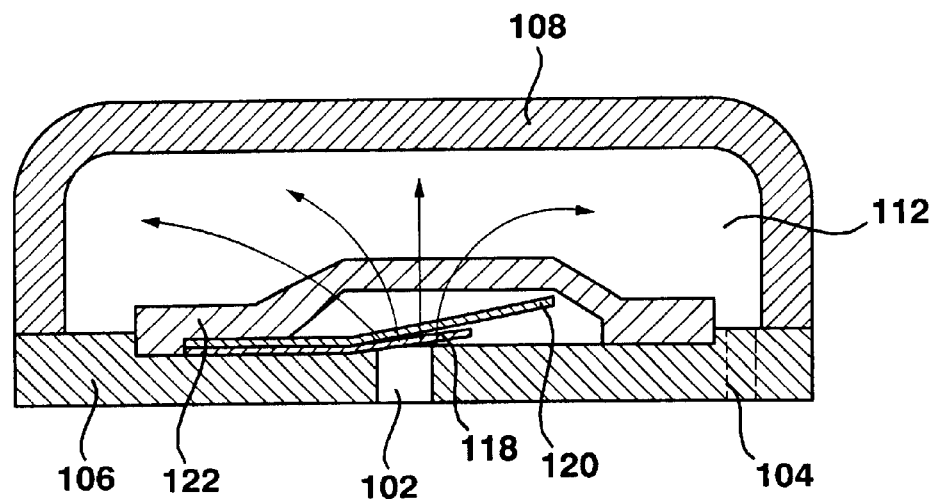
FIG. 2 is a sectional view of the part of the conventional compressor of FIG. 1.
Figure 3:
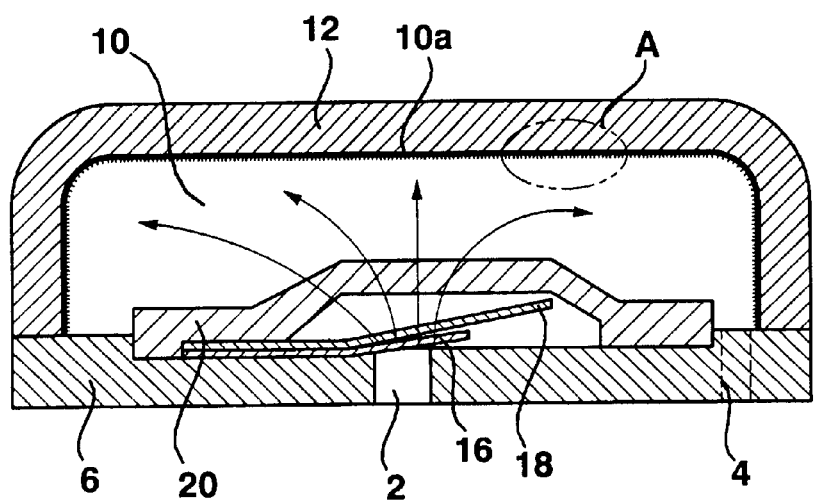
FIG. 3 is a sectional view of a part of a compressor in accordance with the present invention.

FIG. 3 is a sectional view of a part of a compressor in accordance with the present invention.

As shown in the drawing, the compressor of this invention comprises a valve seat 6, a head cover 12, and a control valve 16. The head cover 12 covers the top of the valve seat 6 to form a discharge plenum 10 between the valve seat 6 and the head cover 18. This discharge plenum 10 is used for temporarily storing a highly pressurized working fluid therein. A fluid inlet 2 is formed at the valve seat 6, and allows an introduction of the highly pressurized working fluid, compressed by a reciprocating motion of a piston (not shown), into the discharge plenum 10 between the valve seat 6 and the head cover 18. The valve seat 6 also has a fluid outlet 4, through which the highly pressurized working fluid is discharged from the discharge plenum 10. The control valve 16 is mounted to the valve seat 6 so as to control the fluid inlet 2. That is, when the pressure of the inlet working fluid is higher than a predetermined reference level, the control valve 16 opens the fluid inlet 2 so as to allow an introduction of the fluid into the discharge plenum 10. The compressor of this invention also comprises a noise attenuation means. This noise attenuation means is provided within the discharge plenum 10 so as to absorb and attenuate the impact waves of the working fluid generated when the impact waves collide against the interior wall of the plenum 10. The noise attenuation means thus effectively attenuates operational noises and vibrations of the compressor.

The discharge plenum 10 is a cavity, which is defined between the valve seat 6 and the head cover 12 and temporarily stores the highly pressurized working fluid therein so as to increase the pressure of the working fluid to a predetermined level prior to discharging the fluid from the plenum 10 through the fluid outlet 4.

A valve spring 18 and a retainer 20 are mounted to the valve seat 6 at positions above the control valve 16. The valve spring 18 elastically holds the control valve 16, while the retainer 20 holds the first ends of both the control valve 16 and the valve spring 18 so as to limit the opening angle of the control valve 16.

Figure 4:
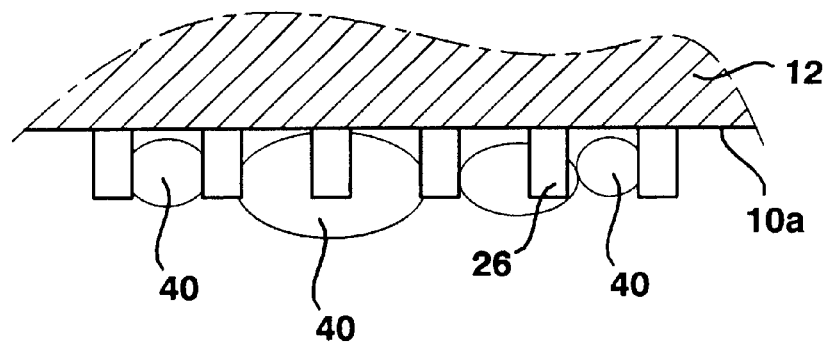
FIG. 4 is a partially enlarged view of the portion "A" of FIG. 3, showing the construction of a noise attenuation means in accordance with the primary embodiment of the present invention.

FIG. 4 is a partially enlarged view of the portion "A" of FIG. 3, showing the construction of the noise attenuation means in accordance with the primary embodiment of the present invention. As shown in the drawing, the noise attenuation means according to the primary embodiment, which absorbs and attenuates the impact waves of the working fluid generated when the waves collide against the interior wall 10a of the discharge plenum 10, thus attenuating operational noises and vibrations of the compressor, comprises a plurality of micro-projections 26 formed on the interior wall 10a of the discharge plenum 10 such that the projections 26 have the same height and size.

The micro-projections 26 of this embodiment may be formed on the interior wall 10a of the discharge plenum 10 as projections formed through MEMS (micro electronic mechanical system), which has been typically used as a micro surface machining system. Alternatively, the micro-projections 26 may be formed as embossments formed through an embossing process.

The micro-projections 26, formed on the interior wall 10a of the discharge plenum 10, have a very small height and width not larger than several hundred micrometers, and effectively absorb and attenuate vibrations and noises in a specified frequency band. A plurality of micro spaces are defined between the interior wall 10a of the discharge plenum 10 and the projections 26.

Working fluid drops 40 are captured in the micro spaces between the interior wall 10a of the discharge plenum 10 and the projections 26, and have specific shapes and specific vibration characteristics determined by the sizes and shapes of said spaces. The working fluid drops 40, captured in the micro spaces between the interior wall 10a of the discharge plenum 10 and the projections 26, act as an absorbent capable of absorbing and attenuating the operational noises and operational vibrations caused by the impact waves of the working fluid when the working fluid collide against the interior wall 10a of the discharge plenum 10.

Of course, it should be understood that the noise attenuation means of the present invention may be designed to have another structure in addition to the above-mentioned projections and embossments without affecting the functioning of this invention if the structure can form desired spaces on the interior wall 10a of the discharge plenum 10 for effectively capturing the working fluid drops 40 in the spaces.

Figure 5:
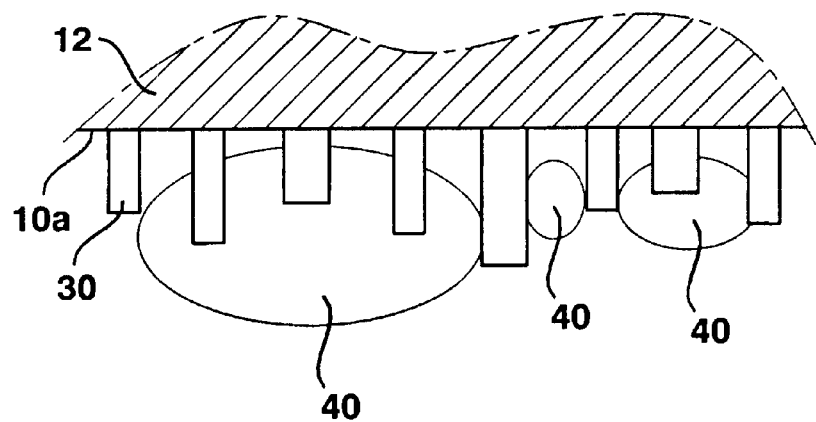
FIG. 5 is a partially enlarged view of the portion "A" of FIG. 3, showing the construction of a noise attenuation means in accordance with the second embodiment of the present invention.

FIG. 5 is a partially enlarged view of the portion "A" of FIG. 3, showing the construction of the noise attenuation means in accordance with the second embodiment of the present invention.

As shown in the drawing, the noise attenuation means according to the second embodiment comprises a plurality of micro-projections 30 formed on the interior wall 10a of the discharge plenum 10 such that the projections 30 have different heights and sizes. Therefore, a plurality of micro spaces having different sizes and shapes are defined between the interior wall 10a of the discharge plenum 10 and the projections 30. Since the micro spaces formed by the projections 30 have different sizes and shapes, the working fluid drops 40 captured in said spaces have a variety of shapes and a variety of vibration characteristics, thus more effectively absorbing and attenuating vibrations and noises in a wider frequency band.

In the present invention, it is preferable to make the micro-projections 30 using an elastic material, thus more effectively absorbing and attenuating the operational noises caused by the impact waves of the working fluid in the case of a collision of the working fluid with the interior wall 10a of the discharge plenum 10.

The operational effect of the compressor of this invention will be described herein below.

In an operation of the reciprocating compressor of this invention, a reciprocating motion of a piston compresses working fluid. When the pressure of the compressed working fluid is higher than a predetermined reference level, the control valve 16 opens the fluid inlet 2, and so the highly pressurized working fluid flows into the discharge plenum 10 through the fluid inlet 2. The working fluid is temporarily stored in the discharge plenum 10 while being increased in its pressure to a level higher than a predetermined reference level, and is discharged from the discharge plenum 10 through the fluid outlet 4.

When the highly pressurized working fluid is introduced into the discharge plenum 10, the impact waves of the working fluid collide with the interior wall 10a of the discharge plenum 10 or other obstacles, thus generating operational noises and operational vibrations having a wide frequency and resonating in accordance with the specific shape of the interior of the discharge plenum 10.

However, the compressor of this invention with the noise attenuation means effectively absorbs and attenuates the operational vibrations and noises by means of the working fluid drops 40 captured in the spaces formed between the projections 26 or 30 and the interior wall 10a of the discharge plenum 10. Therefore, it is possible to attenuate the operational vibrations and noises caused by the surging of the working fluid under high pressure within the discharge plenum 10 and improve the operational reliability of the compressor.

As described above, the present invention provides a compressor for refrigeration cycles, which is provided with a noise attenuation structure on the interior wall of the discharge plenum. The noise attenuation structure is accomplished by a plurality of micro-projections formed on the interior wall of the discharge plenum. A plurality of spaces capable of capturing working fluid drops are defined between the projections and interior wall of the discharge plenum. Due to the working fluid drops captured in said spaces, it is possible to absorb and attenuate the impact waves of the working fluid generated when the impact waves collide against the interior wall of the plenum. The compressor of this invention thus effectively attenuates operational noises and vibrations during an operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A reciprocating compressor, comprising:
    at least one reciprocating piston operatively compressing a working fluid within said compressor; and
    a valve assembly, wherein said valve assembly includes
        a valve seat covered with a head cover at its top to form a discharge plenum between said valve seat and said head cover, said discharge plenum temporarily storing a pressurized working fluid therein, said valve seat having a fluid inlet used for allowing an introduction of the pressurized working fluid into said discharge plenum, and a fluid outlet used for discharging the pressurized working fluid from the discharge plenum;
        a control valve mounted to said valve seat and used for controlling the fluid inlet; and
        noise attenuation means provided within said discharge plenum for absorbing and attenuating impact waves of the working fluid during an introduction of the working fluid into the discharge plenum, thus attenuating operational noises and vibrations caused by said impact waves, wherein said noise attenuation means comprises a plurality of micro-projections formed on an interior wall of the discharge plenum, with a plurality of micro spaces being defined between the microprojections and the interior wall of the discharge plenum and being capable of capturing working fluid drops therein.

2. The compressor according to claim 1, wherein the working fluid is compressed by the reciprocating motion of the at least one piston prior to being introduced into the discharge plenum through the fluid inlet.

3. The compressor according to claim 1, wherein said micro-projections are embossments formed on the interior wall of the discharge plenum through an embossing process.

4. The compressor according to claim 1, wherein said micro-projections are formed on the interior wall of the discharge plenum to project from said interior wall.

5. The compressor according to claim 1, wherein said micro-projections have different heights.

6. The compressor according to claim 1, wherein said micro-projections have different widths.

7. The compressor according to claim 1, wherein said micro-projections have a variety of shapes.

8. The compressor according to claim 1, wherein said micro-projections are made of an elastic material capable of absorbing operational vibrations.

9. A valve assembly for a compressor comprising:
    a valve seat covered with a head cover at its top to form a discharge plenum between said valve seat and said head cover, said discharge plenum temporarily storing a pressurized working fluid therein, said valve seat having a fluid inlet used for allowing an introduction of the pressurized working fluid into said discharge plenum, and a fluid outlet used for discharging the pressurized working fluid from the discharge plenum;
    a control valve mounted to said valve seat and used for controlling the fluid inlet; and
    noise attenuation means provided within said discharge plenum for absorbing and attenuating impact waves of the working fluid during an introduction of the working fluid into the discharge plenum, thus attenuating operational noises and vibrations caused by said impact waves, wherein said noise attenuation means comprises a plurality of micro-projections formed on an interior wall of the discharge plenum, with a plurality of micro spaces being defined between the microprojections and the interior wall of the discharge plenum and being capable of capturing working fluid drops therein.

10. The valve assembly according to claim 9, wherein said micro-projections are embossments formed on the interior wall of the discharge plenum through an embossing process.

11. The valve assembly according to claim 9, wherein said micro-projections are formed on the interior wall of the discharge plenum to project from said interior wall.

12. The valve assembly according to claim 9, wherein said micro-projections have different heights.

13. The valve assembly according to claim 9, wherein said micro-projections have different widths.

14. The valve assembly according to claim 9, wherein said micro-projections have a variety of shapes.

15. The valve assembly according to claim 9, wherein said micro-projections are made of an elastic material capable of absorbing operational vibrations.

* * * * *